Patented Nov. 22, 1949

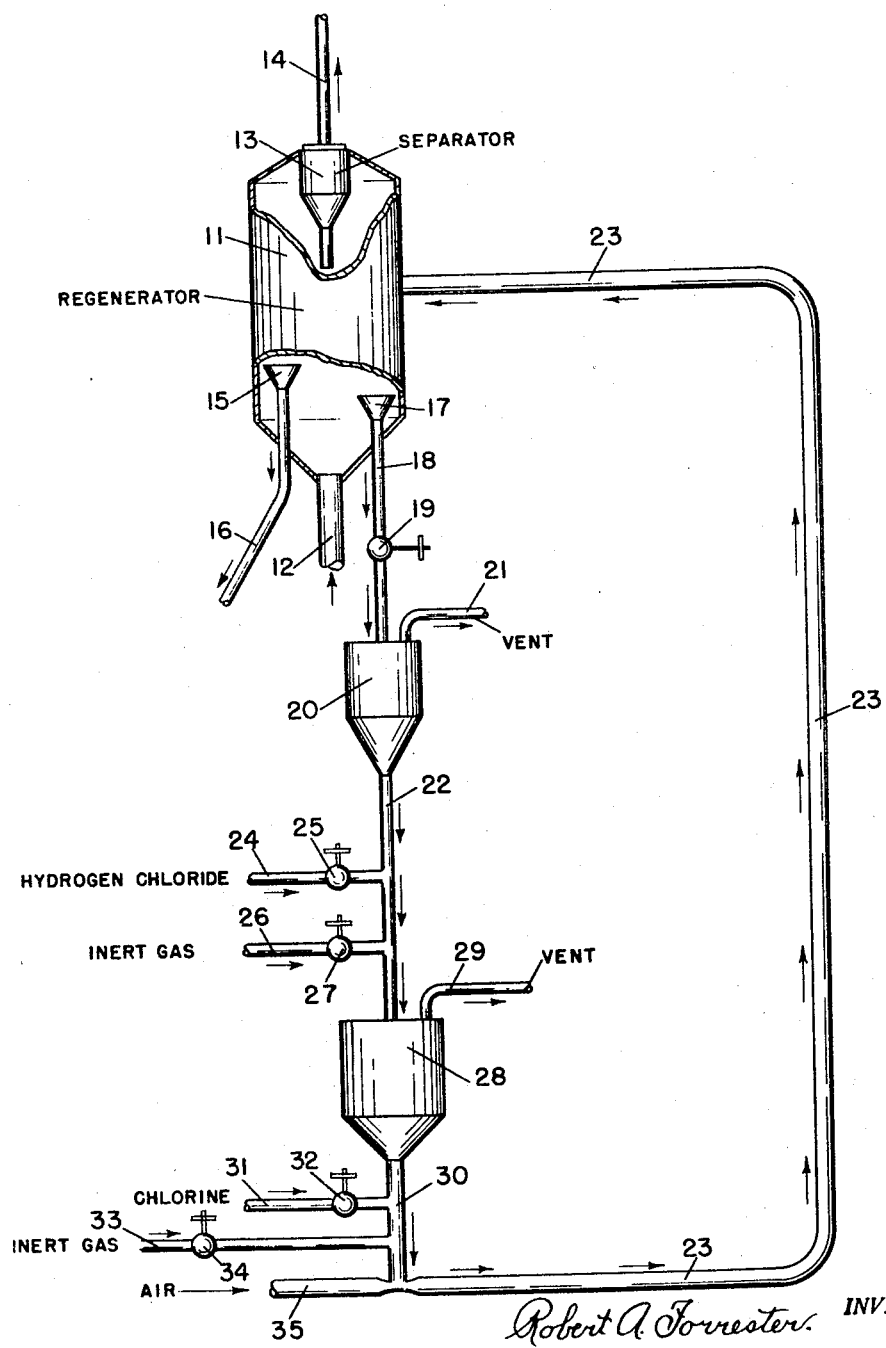

2,488,718

UNITED STATES PATENT OFFICE 2,488,718

PROCESS FOR THE REMOVAL OF CATALYST IMPURITIES FROM REGENERATED CATALYST

Robert A. Forrester, Baytown, Tex., assignor, by mesne assignments, to Standard Oil Development Company, Elizabeth, N. J., a corporation of Delaware Application July 12, 1947, Serial No. 760,612

5 Claims. (Cl. 196—52)

The present invention is directed to a method for catalytic cracking employing a fluidized solid catalyst. More particularly, the invention is directed to an improved method for treating a cracking catalyst which is employed in the catalytic cracking of hydrocarbons.

It is known to the art to treat hydrocarbons with finely divided solid catalyst in processes involving a reaction zone and a regeneration zone. These processes may be generally described as involving contacting hydrocarbons with the finely divided solid catalyst in the reaction zone under suitable physical conditions to cause the cracking of a substantial portion of the hydrocarbons charged to the reaction zone, the removal of finely divided spent catalyst and converted hydrocarbons from the reaction zone and the subsequent regeneration of the spent catalyst in a regeneration zone in the presence of combustion gases. The regenerated catalyst may then be recycled to the reaction zone.

The present invention is directed to a catalytic cracking process involving a finely divided or fluidized solid catalyst and is particularly directed to an improvement in the step of regenerating the spent catalyst to obtain a regenerated catalyst of substantially improved activity over that conventionally obtained in the cracking art when employing a fluidized solid catalyst.

The feature of the present invention may be described briefly as involving the regeneration of the fluidized solid catalyst in the presence of combustion gases, the withdrawal of at least a substantial portion of the solid catalyst from contact with the hot combustion gases and the contacting of the withdrawn portion of the catalyst alternately with hydrogen chloride and chlorine at a temperature in the range between 850° and 1200° F. to remove at least a substantial portion of metallic contaminating materials from the catalyst. The catalyst, after contact with hydrogen chloride, is purged with an inert gas such as air, nitrogen, or carbon dioxide and is then subjected to a treatment with anhydrous chlorine following which it is again purged with an inert gas as illustrated above and returned to the regeneration zone prior to recycling to the reaction zone.

In conventional catalytic cracking processes employing a fluidized solid catalyst, the catalyst is circulated continuously through the system. The circulating cycle involves passing catalyst to the reaction zone, withdrawal of spent catalyst from the reaction zone to the regeneration zone and the return of the regenerated catalyst to the reaction zone. In the regeneration zone the catalyst is contacted with a combustion gas at a relatively high temperature in order to remove carbonaceous material therefrom and the combustion gases are necessarily removed from the regeneration zone. The combustion gases removed from the regenerating zone invariably remove at least small portions of catalyst from the zone and fresh catalyst must therefore be added to the system to compensate for the catalyst lost. It will be understood that the major portion of the catalyst remains in the system for extended intervals of time and as it is recirculated it becomes contaminated with metallic constituents. Such metallic contaminants may be introduced with the feed stock or eroded from the equipment; the metallic materials employed in the construction of the catalytic cracking unit may cause the catalyst to be contaminated with iron, nickel and chromium. The contaminating metals present in the catalyst undesirably affect the cracking reaction in that they cause increased production of dry gas and carbon.

In accordance with the present invention, the fluidized solid catalyst is treated to remove metallic contaminants therefrom in order to obtain an improved regenerated catalyst. The metallic contaminants are removed from the catalyst being circulated through the catalytic cracking system by intimately contacting the contaminated catalyst with anhydrous hydrogen chloride following which the catalyst is purged of residual hydrogen chloride and the purged catalyst is then contacted with anhydrous chlorine and again purged with an inert gas to remove residual chlorine. This treatment with hydrogen chloride and chlorine should be carried out at relatively high temperatures, and it is preferred to carry out the treatment with hydrogen chloride and chlorine in sequence at a temperature no lower than 850° F. In order to prevent the deleterious effects caused by exposure of catalyst to unduly high temperatures, it is desirable that the catalyst be subjected to a temperature no greater than approximately 1200° F.

The invention will now be described in greater detail in conjunction with the drawing in which the sole figure illustrates one mode of practicing the invention.

Turning now to the drawing, a regenerator 11 is provided with an inlet line 12 discharging into the lower end thereof. A cyclone separator 13 is provided in the upper end of vessel 11 and from this separator is an outlet line 14 for the separated combustion gases. A funnel shaped member 15 is arranged in the bottom of the regenerator to collect regenerated catalyst dropping to the bottom of the regenerator and in turn is connected to a discharge pipe 16 which may discharge to a reactor, not shown. It is understood that other parts of the apparatus including a reactor connected to pipe 16 and a suitable separating device, such as a Cottrell precipitator, connected to line 14 are conventional to the art, but are not shown in the drawing for the purpose of simplifying the description. The arrangement of a complete catalytic cracking unit including the reaction and regeneration zones is well known to the art as shown, for example, in U. S. Patent 2,407,374, filed August 1, 1944, by Conrad H. Kollenberg and entitled "Catalytic cracking process."

Within regenerator 11 is arranged a second funnel shaped member 17 which discharges into a line 18 controlled by valve 19 and which, in turn, discharges into a hopper shaped vessel 20 which is provided with a vent line 21. The lower portion of the vessel 20 is in the form of a cone and discharges into a vertical downwardly extending pipe 22. Pipe 22 is fluidly connected in a manner to be described, to a pipe 23 which serves as a recycle line and discharges into regenerator 11 at approximately midpoint thereof. Inlet line 24 controlled by valve 25 is provided, by way of which gaseous anhydrous hydrogen chloride may be introduced into line 22. Inlet line 26 controlled by valve 27 at a point substantially below the location of inlet line 24 is arranged for introduction of an inert gas such as air, nitrogen, or carbon dioxide to purge the catalyst free of hydrogen chloride. The portion of pipe 22 below inlet line 25 discharges into a second hopper shaped vessel 28 which is provided, similar to hopper shaped vessel 20, with a vent line 29. Vessel 28 has its lower portion in the form of a cone and it terminates and discharges into vertical downwardly extending pipe 30 which ultimately discharges into line 23. Located in pipe 30 is an inlet line 31 controlled by valve 32 by way of which gaseous anhydrous chlorine may be introduced into the system to contact the catalyst which has been treated with hydrogen chloride. At a point substantially lower than inlet line 31, a second inlet line 33 controlled by valve 34 discharges into line 30 by way of which inert gas, such as that of the type mentioned before, may be introduced to remove residual chlorine from the treated catalyst. The chlorine and inert gas may be discharged from the system by vent line 29.

The catalyst, which has now been treated in sequence with hydrogen chloride, inert gas, chlorine, and inert gas, drops downward into line 23 where it is met by a blast of air introduced by line 35 which serves to transport the treated catalyst by way of line 23 back into regenerator vessel 11.

In the arrangement of the present invention described with reference to the sole figure, it will be seen that a substantial portion of the catalyst in the regenerator system is continuously being treated with hydrogen chloride, purged with an inert gas and then treated with substantially anhydrous chlorine and purged again with an inert gas and returned to the regenerator. The treatment at high temperatures serves to reduce the amount of metallic contaminants in and on the catalyst being circulated in the system. It will be apparent that the portion of the catalyst circulated through the system which is treated to reduce the metallic constituents may be varied over a considerable range. If desired, all of the catalyst sent to the regenerator zone may be contacted in sequence with hydrogen chloride and chlorine at high temperatures but usually it will be found that the treatment of a minor portion of the catalyst in the regenerator zone will produce satisfactory results.

The invention will be further illustrated by runs in which a silica-alumina catalyst which had been employed in a commercial catalytic cracking unit was regenerated by burning off carbonaceous material at a temperature in the range between 850° and 1200° F. Following the regeneration of the catalyst by combustion of carbonaceous material, a portion of the regenerated catalyst was subjected to a treatment at a temperature in the range between 900° and 1000° F. with hydrogen chloride, the hydrogen chloride was removed from the catalyst, and the catalyst was then treated with chlorine. In the first run, the catalyst was treated with hydrogen chloride and then with chlorine in sequence for a total treating time of six hours. In the second run, the hydrogen chloride treatment was followed by chlorine treatment for a total treating time of three hours.

The data shown in the following table gives the results of these runs:

Table I

| Treatment | HCl followed by chlorine | HCl followed by chlorine |
|---|---|---|
| Treating time, Hrs. | 6 | 3 |
| Iron Content, Weight Per Cent, Fe₂O₃: | | |
| Before | 0.65 | 0.38 |
| After | 0.47 | 0.27 |
| Loss | 0.18 | 0.11 |
| D+L at 400° F.: | | |
| Before | 24.6 | 23.6 |
| After | 29.6 | 23.8 |
| Increase | 5.0 | 0.2 |
| Gas Producing Factor: | | |
| Before | 3.00 | 1.71 |
| After | 1.53 | 1.38 |
| Decrease | 1.47 | 0.33 |
| Carbon Producing Factor: | | |
| Before | 2.45 | 1.53 |
| After | 1.24 | 1.12 |
| Decrease | 1.21 | 0.41 |

It will be apparent from the results of the foregoing treatments that the iron content of the catalyst has been reduced substantially. In both runs an improvement in D+L at 400° F. was noted, the greatest increase being obtained for the treatment over the six-hour period. It will also be apparent that the gas-producing and carbon-producing factors of the catalyst have been substantially reduced by treatment in accordance with the present invention.

A silica-alumina catalyst from a commercial scale fluid catalytic cracking unit which had been regenerated by treatment at a combustion temperature between 850° and 1200° F. with a free oxygen-containing gas was treated with anhydrous chlorine for ¼ hour, the chlorine was removed and this treatment was followed by treatment with anhydrous hydrogen chloride for 2¾ hours. The treatment was conducted at a temperature of 1000° F. The results obtained are shown in Table II.

Table II

| | | |
|---|---|---|
| Treatment | | Cl₂ then HCl |
| Time, hours | | ¼    2¾ |
| Iron content, weight per cent Fe₂O₃: | | |
| Before | | 0.36 |
| After | | 0.27 |
| Loss | | 0.09 |
| Gas producing factor: | | |
| Before | | 1.71 |
| After | | 1.47 |
| Decrease | | 0.24 |
| Carbon producing factor: | | |
| Before | | 1.53 |
| After | | 1.04 |
| Decrease | | 0.49 |

It will be apparent from the data in Table II that treatment with chlorine followed by hydrogen chloride also produced an improvement in the catalyst by lowering the iron content and substantially lowering the gas-producing and carbon-producing factors indicating further that these factors are directly related to the iron content in the catalyst. It will also be apparent on comparing the data in Tables I and II that the treatment with hydrogen chloride followed by chlorine gives substantially greater improvement than chlorine followed by hydrogen chloride.

In a still further example in accordance with the present invention, a catalyst which had been used in a commercial cracking operation was regenerated by heating in air at 850° F. and then treated with hydrogen chloride followed by chlorine at 900° F. for six hours. The chlorine was allowed to displace the hydrogen chloride from the catalyst. Table III below shows the change in cracking activity and the reduction of contaminating material obtained when employing the process of the present invention:

Table III

|  | D + L at 400° F. | Gas Producing Factor | Carbon Producing Factor |
| --- | --- | --- | --- |
| Before treatment | 24.0 | 3.0 | 2.45 |
| After treatment | 29.0 | 1.53 | 1.24 |

It will be apparent from the data in Table III that the D+L at 400° F. has been substantially increased while the gas-producing and carbon-producing factors have been substantially decreased. Higher D+L at 400° F. values indicate increased activity and lower gas-producing and carbon-producing factors indicate substantial decreases in the formation of undesirable material such as gas and carbon. It will be seen from the foregoing data in Table III that all three of the values involved are appreciably improved by proceeding in accordance with the present invention.

The expression D+L at 400° F. appearing as one of the activity test results is a measure of catalytic activity. The method of expressing catalyst activity (D+L at 400° F.) indicates the percentage of product distilled at 400° F. plus the distillation loss of the naphtha which is obtained when testing the product obtained by passing a standard feed stock through the catalyst under standard conditions of temperature and pressure. This method of expressing catalyst activity has been widely adopted in the cracking industry.

The gas and carbon producing factors are determined by measuring the gas and carbon produced by passing a standard feed stock through the catalyst under standard conditions of temperature and pressure and comparing the amount of gas and carbon produced with the amount obtained when passing the same feed stock over a stream of deactivated catalyst which will give the same gas oil conversion as does the catalyst in question.

While it is preferred to employ the treating sequence with hydrogen chloride followed by the treatment with chlorine, it will be seen that chlorine treatment may be followed by hydrogen chloride and still obtain beneficial results. Therefore, I do not wish to limit myself to the sequence of operation in which hydrogen chloride is followed by chlorine treatment.

The amount of hydrogen chloride employed in the treating sequence of the present invention should be sufficient to react with all of the contaminating materials contained in the cracking catalyst. Therefore, an amount of hydrogen chloride and chlorine at least equivalent to the metal contaminants of the cracking catalyst should be employed.

It will usually be desirable to use the chlorine in an amount in excess of the hydrogen chloride. However, equal amounts of hydrogen chloride and chlorine may be used. It is believed that intimately contacting the contaminated catalyst with hydrogen chloride for a short period of time and then with chlorine for a short period of time serves to oxidize the metallic contaminants and cause their removal as volatile halides.

While the invention has been described with respect to treatment with hydrogen chloride followed by one treatment with chlorine, it is within the spirit and scope of the invention to follow the chlorine treatment with still a subsequent treatment with hydrogen chloride and then treat the catalyst again with chlorine, if necessary, provided the halogens employed in each treating step are removed prior to the contacting with a different halogen.

The invention has been described and illustrated by reference to the use of hydrogen chloride and chlorine. It is possible, however, to treat the catalyst with hydrogen bromide and follow this treatment with elemental bromine. On the other hand, it may be possible to treat the catalyst with hydrogen chloride and follow the hydrogen chloride treatment with a bromine treatment or vice versa.

While the invention has been described with respect to treating catalysts employed in the catalytic cracking of hydrocarbons by the fluid technique, it will be apparent that the treating procedure may be applied equally well to Fischer-Tropsch synthesis operations in which the fluid technique is employed and when non-iron type catalysts are employed in the synthesis operation.

In the practice of the present invention, it is important that the catalyst which is subjected to treatment with anhydrous hydrogen chloride and chlorine be in a regenerated condition. The term regenerated should mean that the catalyst has been subjected to a combustion operation to remove substantially all of the carbon deposited thereon during the conversion operation. If a catalyst were treated, in accordance with the present invention, which included a substantial quantity of carbon, the chlorine would react with the alumina in the silica-alumina catalyst to form aluminum chloride which would be lost from the system, thus depleting the catalyst of alumina. When a catalyst comprising substantial quantities of carbon is treated with anhydrous hydrogen chloride, the reaction rate is considerably decreased. Thus, too much emphasis cannot be laid on the substantial removal of carbon from the catalyst prior to its treatment as disclosed, and claimed hereinafter.

The nature and objects of the present invention having been fully described and illustrated, what I wish to claim as new and useful and to secure by Letters Patent is:

1. In a catalytic cracking process in which there is a cracking zone and a catalyst regeneration zone wherein a catalyst is subjected to a hot combustion supporting gas, the steps of withdrawing catalyst from the regeneration zone, separately contacting the withdrawn catalyst with anhydrous hydrogen chloride and with anhydrous chlorine at a temperature in the range between 850° F. to 1200° F. and employing the contacted catalyst in the cracking zone.

2. In a catalytic cracking process in which there is a cracking zone and a catalyst regeneration zone, the steps of contacting the catalyst in the regeneration zone with hot combustion supporting gas, withdrawing a portion of the catalyst from the regeneration zone, contacting the withdrawn catalyst in sequence with anhydrous hydrogen chloride and then with chlorine at a temperature between 850° to 1200° F. under conditions to remove at least a substantial portion of metallic contaminants therefrom, and returning the contacted catalyst to the regeneration zone.

3. In a catalytic cracking process in which there is a cracking zone and a catalyst regeneration zone, the steps of contacting the catalyst in the regeneration zone with hot combustion supporting gas, withdrawing a portion of the catalyst from the regeneration zone, contacting the withdrawn catalyst with anhydrous hydrogen chloride, separating at least a major portion of the anhydrous hydrogen chloride from the contacted catalyst, contacting the hydrogen chloride treated catalyst with anhydrous chlorine, separating at least a major portion of the chlorine from the contacted catalyst, and returning the catalyst to the regeneration zone.

4. In a catalytic cracking process wherein a finely divided solid catalyst is intimately contacted with hydrocarbons in a cracking zone under conditions to cause cracking of at least a portion of the hydrocarbons and wherein catalyst is withdrawn from the cracking zone to a catalyst regeneration zone, the steps of contacting catalyst with a hot combustion supporting gas in the regeneration zone, withdrawing a substantial portion of finely divided catalyst from the regeneration zone and contacting it at a temperature in the range of 850° to 1200° F. alternately with anhydrous hydrogen chloride and anhydrous chlorine and subsequently returning the contacted catalyst to the catalyst regeneration zone and recycling catalyst from the catalyst regeneration zone to the cracking zone.

5. In a catalytic cracking process wherein a finely divided catalyst is intimately contacted with hydrocarbons in a cracking zone under conditions to cause cracking of at least a portion of the hydrocarbons and wherein catalyst is withdrawn from the cracking zone to a catalyst regeneration zone, the steps of contacting catalyst with a hot combustion supporting gas in the regeneration zone, withdrawing a substantial portion of finely divided catalyst from the regeneration zone and contacting it at a temperature in the range of 850° to 1200° F. with gaseous anhydrous hydrogen chloride, separating at least a major portion of the hydrogen chloride from the contacted catalyst, contacting the hydrogen chloride treated catalyst with gaseous anhydrous chlorine, separating at least a major portion of chlorine from the contacted catalyst, and subsequently returning the contacted catalyst to the catalyst regeneration zone and recycling catalyst from the catalyst regeneration zone to the cracking zone.

ROBERT A. FORRESTER.

REFERENCES CITED

The following references are of record in the file of this patent:

UNITED STATES PATENTS

| Number | Name | Date |
|---|---|---|
| 1,430,454 | Low | Sept. 26, 1922 |
| 1,785,464 | Suzuki et al. | Dec. 16, 1930 |
| 1,848,723 | Jaeger | Mar. 8, 1932 |
| 2,246,900 | Schulze et al. | June 24, 1941 |
| 2,380,731 | Drake et al. | July 31, 1945 |
| 2,407,701 | Jones et al. | Sept. 17, 1946 |
| 2,414,736 | Gray | Jan. 21, 1947 |
| 2,430,724 | Meadow | Nov. 11, 1947 |

FOREIGN PATENTS

| Number | Country | Date |
|---|---|---|
| 115,333 | Germany | Oct. 31, 1900 |